United States Patent
Subramaniyan et al.

(10) Patent No.: US 9,223,734 B2
(45) Date of Patent: Dec. 29, 2015

(54) SWITCH WITH SYNTHETIC DEVICE CAPABILITY

(71) Applicant: PLX Technology, Inc., Sunnyvale, CA (US)

(72) Inventors: Nagarajan Subramaniyan, San Jose, CA (US); Jeffrey Michael Dodson, Portland, OR (US); Jack Regula, Durham, NC (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/106,579

(22) Filed: Dec. 13, 2013

(65) Prior Publication Data

US 2015/0169487 A1 Jun. 18, 2015

(51) Int. Cl.
G06F 3/00 (2006.01)
G06F 13/40 (2006.01)
G06F 13/28 (2006.01)
G06F 3/06 (2006.01)

(52) U.S. Cl.
CPC ............ *G06F 13/4022* (2013.01); *G06F 3/061* (2013.01); *G06F 3/0659* (2013.01); *G06F 3/0679* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 7,610,431 B1 * | 10/2009 | Watkins et al. | 710/312 |
| 7,631,050 B2 * | 12/2009 | Boyd et al. | 709/208 |
| 7,934,033 B2 * | 4/2011 | Malwankar et al. | 710/104 |
| 8,312,187 B2 * | 11/2012 | Rodrigues et al. | 710/52 |
| 8,521,941 B2 | 8/2013 | Regula | |
| 2003/0035424 A1 * | 2/2003 | Abdollahi et al. | 370/392 |
| 2010/0082921 A1 * | 4/2010 | Thompson et al. | 711/162 |
| 2012/0110259 A1 * | 5/2012 | Mills et al. | 711/113 |
| 2013/0024595 A1 | 1/2013 | Subramaniyan et al. | |

OTHER PUBLICATIONS

Regula, Jack, "Using Non-transparent Bridging in PCI Express Systems", PLX Technology, Inc., Jun. 1, 2004.

Kazmi, Akber, "Non-Transparent Bridging Makes PCI-Express HA Friendly", http://www.eetimes.com/document.asp?doc_id=1202802, EE Times, Aug. 14, 2003.

US Patent Application entitled, "Tunneled Window Connection for Programmed Input Output Transfers Over a Switch Fabric", U.S. Appl. No. 14/073,491, filed Nov. 6, 2013.

* cited by examiner

*Primary Examiner* — Elias Mamo

(57) ABSTRACT

A method of sharing of a function of a device with a plurality of hosts through a PCIe switch is provided. A function on a device is presented to a first host and a second host through the switch. Read and write on the function's register set within the first host and within the second host are captured, thereby enabling a management system of the switch to create a shadow copy of the first host register sets and second host register sets. The creation of sets of shadow queues on the management system is enabled. The first set of shadow queues of the first set of registers is used to direct read and write operations from the first host to the function. The second set of shadow queues of the second set of registers is used to direct read and write operations from the second host to the function.

12 Claims, 4 Drawing Sheets

SWITCH WITH SYNTHETIC DEVICE CAPABILITY

BACKGROUND OF THE INVENTION

1. Field of the Invention

The present invention relates generally to switches and electronic communication. More specifically, the present invention relates to switching between multiple hosts and multiple synthetic or logical devices in an intelligent PCIe switch.

2. Description of the Related Art

Non-transparent bridging first appeared in the late 1990's in the form of the DEC (Digital Equipment Corp.) "Drawbridge", later marketed by Intel Corp as the 21555 Bridge. Non-transparent bridging on PCI Express is described in several articles authored by technical staff at PLX Technology of Sunnyvale, Calif. (See "Using Non-transparent Bridging in PCI Express Systems" by Jack Regula, 2004; "Non-Transparent Bridging Makes PCI-Express HA Friendly," by Akber Kazmi, EE Times, Aug. 14, 2003, the contents of each which is hereby incorporated by reference).

Computer architectures have advanced greatly over the years. Lately, it is becoming more and more commonplace for chip designers to include external data interfaces, such as Universal Serial Bus (USB) interface controllers into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to connect to a host of IO devices through this interconnect.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

As an example, FIG. 1 is a block diagram depicting a normal shared I/O architecture having a standard PCIe switch 102 controlled by management host 104 running switch management software. Switch 102 services one or more hosts, shown as connected host 106 and connected host 108 (also referred to as "local hosts"), for example servers, PCs, and other computing devices. Also connected to switch are one or more devices 110-116 that typically provide some type of function or service for the connected hosts. Within switch 102 are virtual devices 118-124. Virtual devices 118 and 120 are connected to connected host 106 and virtual devices 122 and 124 are connected to connected host 108. Some of these virtual devices have data paths to physical devices 110-114. The functionality and roles of virtual devices 118-124 are described in U.S. Pat. No. 8,521,941, entitled "MULTI-ROOT SHARING OF SINGLE-ROOT INPUT/OUTPUT VIRTUALIZATION," issued on Aug. 27, 2013, which is incorporated by reference for all purposes, where a solution was described that used resource redirection methods when multiple hosts are connected using the non-transparent ports of a PCIe switch that supports shared I/O mechanisms.

SUMMARY OF THE INVENTION

In one aspect of the invention, a method of sharing of a function of a device with a plurality of hosts through a PCIe switch is provided. A function on a device is presented to a first host of a plurality of hosts and a second host of the plurality of hosts through the switch. Read and write on the function's register set within the first host and within the second host are captured, thereby enabling a management system of the switch to create a shadow copy of the first host register sets and second host register sets. The creation of sets of shadow queues on the management system is enabled, wherein a first set of shadow queues is a first set of registers for read and write operations between the function and the first host and wherein a second set of shadow queues is a second set of registers for read and write operations between the function and the second host said sets of shadow queues reflecting command and response queues in the first and second hosts. The first set of shadow queues of the first set of registers is used to direct read and write operations from the first host to the function. The second set of shadow queues of the second set of registers is used to direct read and write operations from the second host to the function.

In another manifestation of the invention, a method of enabling connections of a plurality of devices as a single synthetic device with a host through a PCIe switch is provided. A first device and a second device are combined into a single synthetic device for a host through the switch. Read and write operations initiated by the host that enter the switch are captured, thereby enabling a management system of the switch to create a shadow copy of the host I/O command/completion queues. I/O commands of the host are processed by the management system as the host generates them and are directed to the first device or the second device or both the first device and second device according to a system requirement and configuration of the management system. When the devices complete the I/O operation, the responses from the devices are processed by the management software, which in turn, generates a response to the host to complete the original host initiated I/O command.

In another manifestation of the invention a PCI express switch is provided in connection with a management system having a user interface for managing the sharing and consolidation of device functions with the plurality of hosts.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Methods and systems for consolidating physical devices into a synthetic device in a PCIe switch wherein the synthetic device is implemented using software in the switch management system are described in the various figures. Generally, any device driver model that uses a command queue and completion or response queue FIFO model with doorbells and interrupts for those FIFOs can be presented to connected hosts using the methods and systems described below. Before proceeding, it is useful to describe the basic components. One, as noted, is a FIFO model for input and output from a connected host driver to hardware using the connected host memory. Another is the use of doorbells for the connected host driver to indicate to the hardware that new work has been added or is waiting. Interrupts are used for each completion or response queue for each completion queue for load balancing and indicating work completion. The figures below describe the additional features needed by the innovative PCIe switch of the present invention. Provided first is an overview of these additional features.

Figure 1:
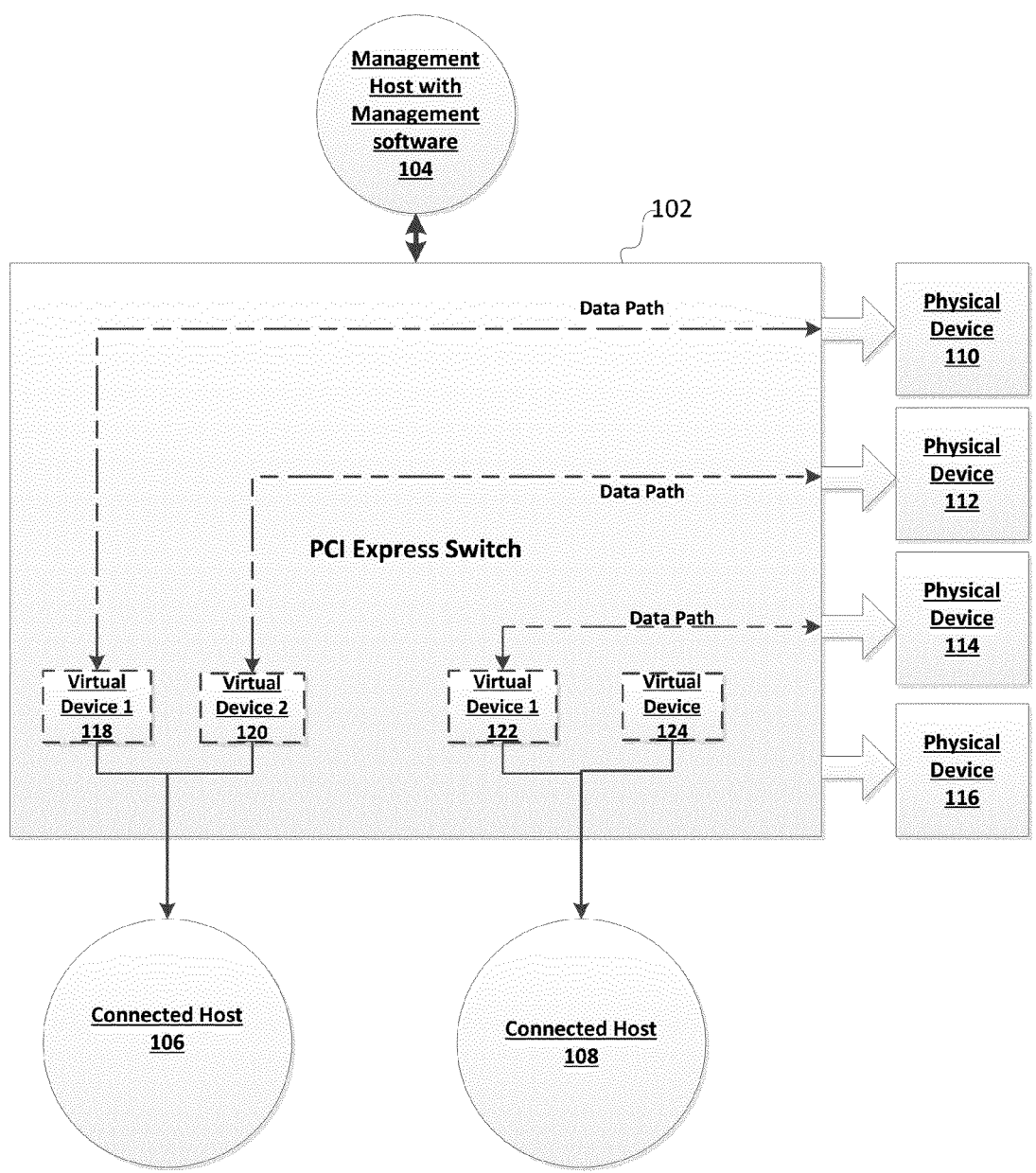
FIG. 1. is a block diagram depicting a normal shared IO architecture having a standard PCIe switch controlled by a system management host running switch management software.
Figure 2:
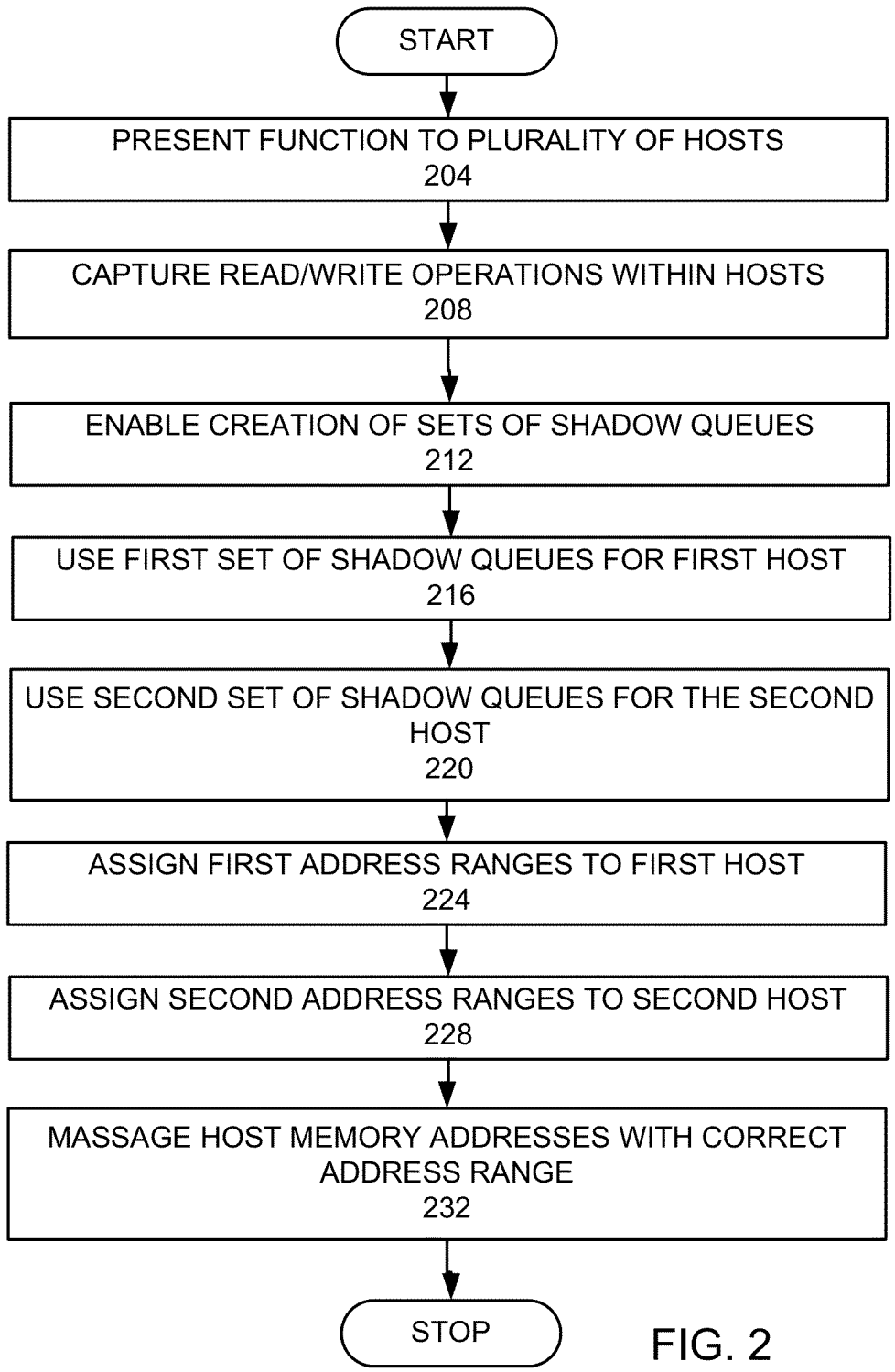
FIG. 2 is a high level flow chart of an embodiment of the invention.
Figure 3:
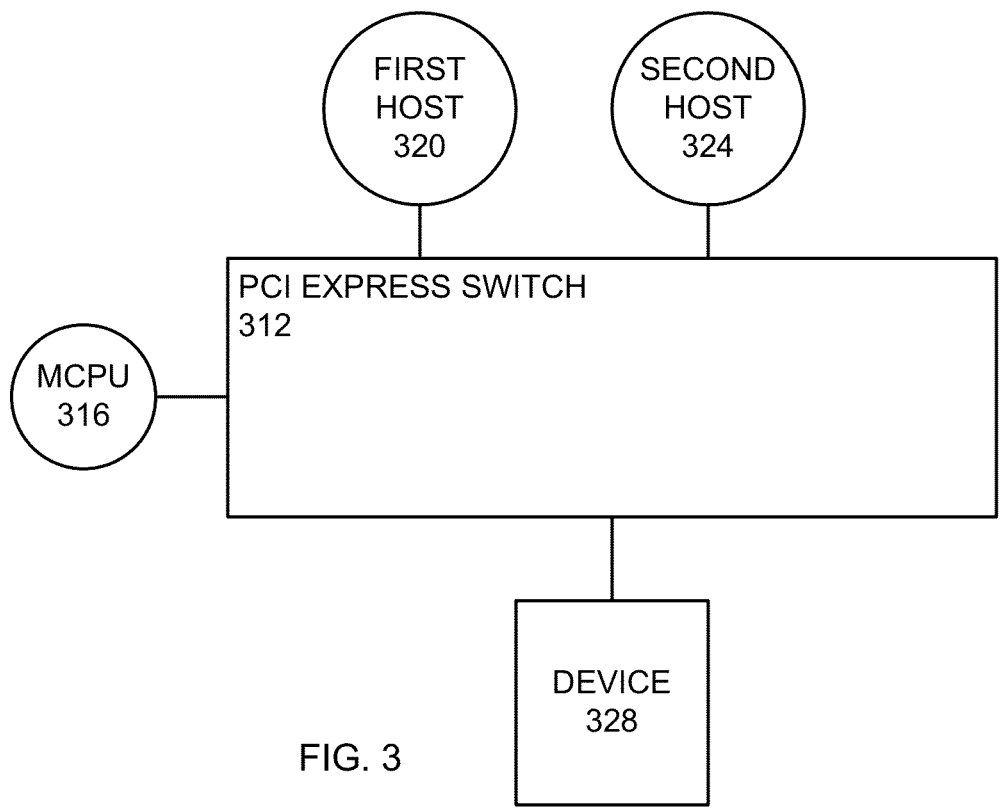
FIG. 3 is a schematic view of an embodiment.

FIG. 2 is a high level flow chart of an embodiment of the invention. A function on a device is shared with a plurality of hosts (step 204). FIG. 3 is a schematic illustration of a system comprising a PCI Express (PCIe) switch 312, controlled by a management system CPU (MCPU) 316 that may be used in this embodiment of the invention. The management system refers to software in the MCPU 316. A plurality of hosts comprising a first host 320 and a second host 324 are connected to the PCIe switch 312. A device 328 with a function is connected to the PCIe switch 312. An example of the device 328 may be a data storage device, such as a hard drive or a solid state memory device. In this example, the device 328 has a single function, since the device 328 is not designed to be shared with multiple hosts. In other embodiment, the device 328 may have multiple functions, but a single function is shared with a plurality of hosts.

This embodiment allows the first host 320 and the second host 324 to share the same function of the device 328. To provide this ability in this embodiment, read and write operations on the function's registers within the first host 320 and with the second host 324 are captured, enabling the management system to create a shadow copy of the first host component queues and the second host register sets (step 208). Shadow queues are created on the management system where a first set of shadow queues comprising a first set of registers for storing data for read and write operations between the function and the first host 320 and a second set of shadow queues comprises a second set of registers for storing data for read and write operations between the function and the second host 324 (step 212). The first set of shadow queues of the first set of registers are used to direct read and write operation from the first host 320 to the function (step 216). The second set of shadow queues of the second set of registers are used to direct read and write operation from the second host 324 to the function (step 220). The management system assigns a first address range to the first host 320 (step 224). In this embodiment a prefix is added to the first host address range. The management system assigns a second address range, that does not overlap with the first address range, to the second host 324 (step 228). In this embodiment a different prefix is added to the first host address range to obtain the second host address range. All of the host memory addresses in the commands issued by the synthetic devices are massaged with the correct address range for that host before handing it to the device (step 232). Devices use this modified address to do I/O to the correct host for a device command. The prefix allows the first host 320 and the second hosts 324 to have different addresses, so that packets from the function may be directed by PCIe switch 312 to either the first host 320 or second host 324. Once the address prefix is set on a command and passed on to the device 328, the device 328 completes the transaction using the new address. The PCIe switch 312 is configured by the management software to direct the right prefix address to the right host, and then stripping the prefix before handling the transaction to the right host.

Figure 4:
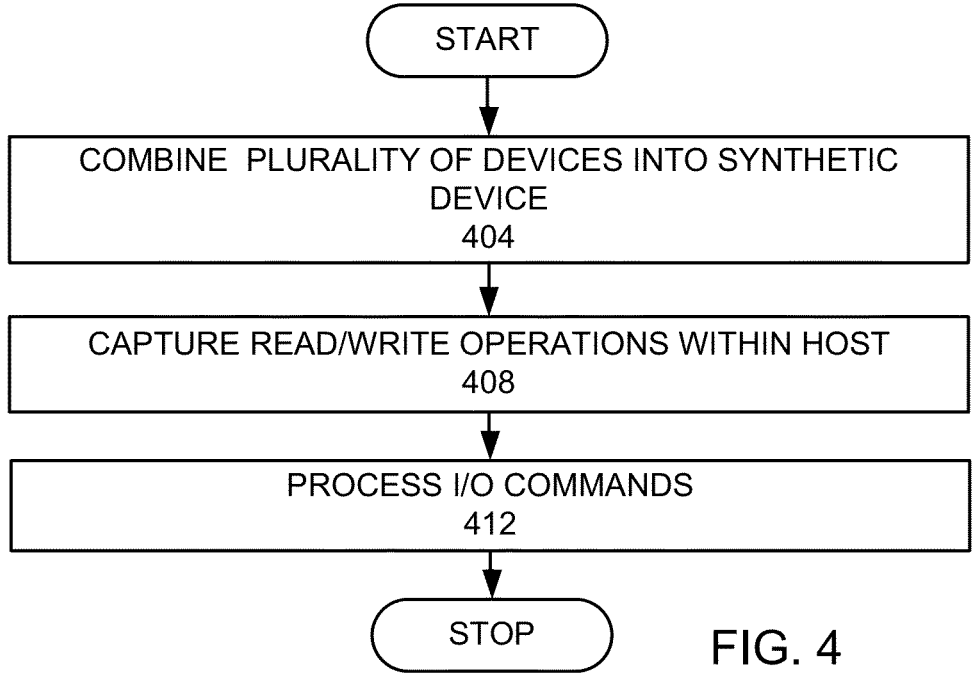
FIG. 4 is a high level flow chart of another embodiment of the invention.
Figure 5:
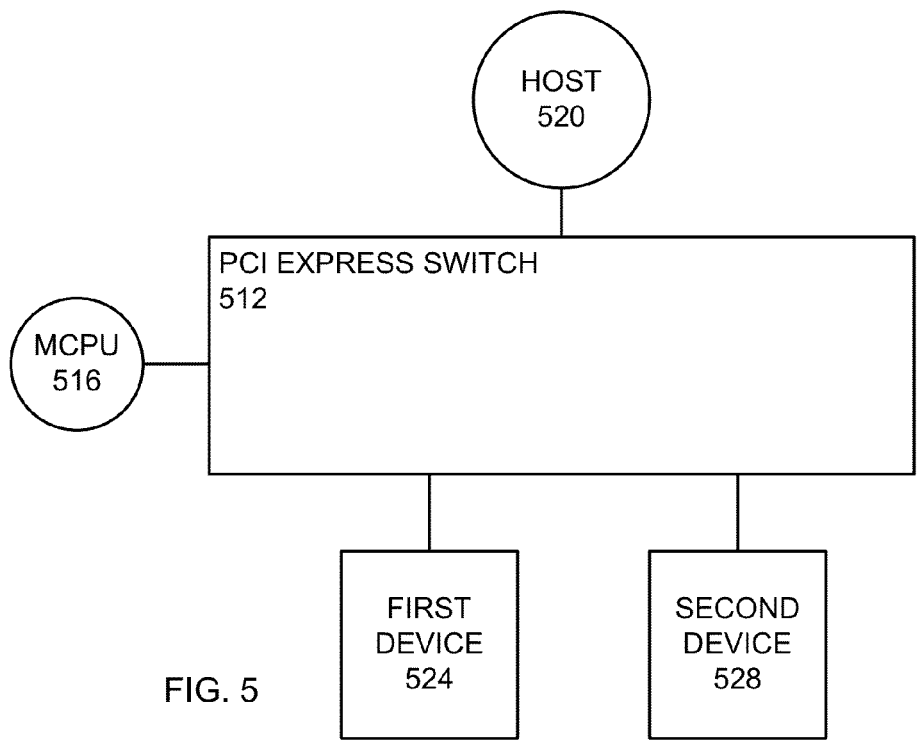
FIG. 5 is a schematic view of another embodiment of the invention.

FIG. 4 is a high level flow chart of another embodiment of the invention. A plurality of devices are combined into a single synthetic device for a host (step 404). FIG. 5 is a schematic illustration of a system comprising a PCI Express (PCIe) switch 512, controlled by a management system CPU (MCPU) 516 that may be used in this embodiment of the invention. The management system refers to software in the MCPU 516. A host 520 is connected to the PCIe switch 512. A first device 524 and a second device 528 are connected to the PCIe switch 512. In this example, the first device 524 and the second device 528 have one or more functions.

This embodiment allows the first device 524 and the second device 528 to be combined into a single synthetic device for the host 520. Read and write operations within the host 520 are captured, enabling the management system of the PCIe switch 512 to create a shadow copy of the host input/output (I/O) command/completion queues (step 408). The I/O commands of the host are processed and directed to the first device or the second device or both the first device and second device according to a system requirement and configuration of the management system.

Embodiments of the invention may enable the operation of synthetic devices, as described in U.S. patent application entitled, "PCI EXPRESS SWITCH WITH LOGICAL DEVICE CAPABILITY," US Patent Application No. 2013/0024595A1, published on Jan. 24, 2013, by Subramaniyan et al., which is incorporated by reference for all purposes. Embodiments of the invention may provide further extensions of the teachings of the cited patent application.

Embodiment of the invention may also use tunneled window connections, as described in U.S. patent application entitled, "TUNNELED WINDOW CONNECTION FOR PROGRAMMED INPUT OUTPUT TRANSFERS OVER A SWITCH FABRIC," U.S. patent application Ser. No. 14/073,491, filed on Nov. 6, 2013, which is incorporated by reference for all purposes.

Example of Implementation of an Embodiment

Figure 6:
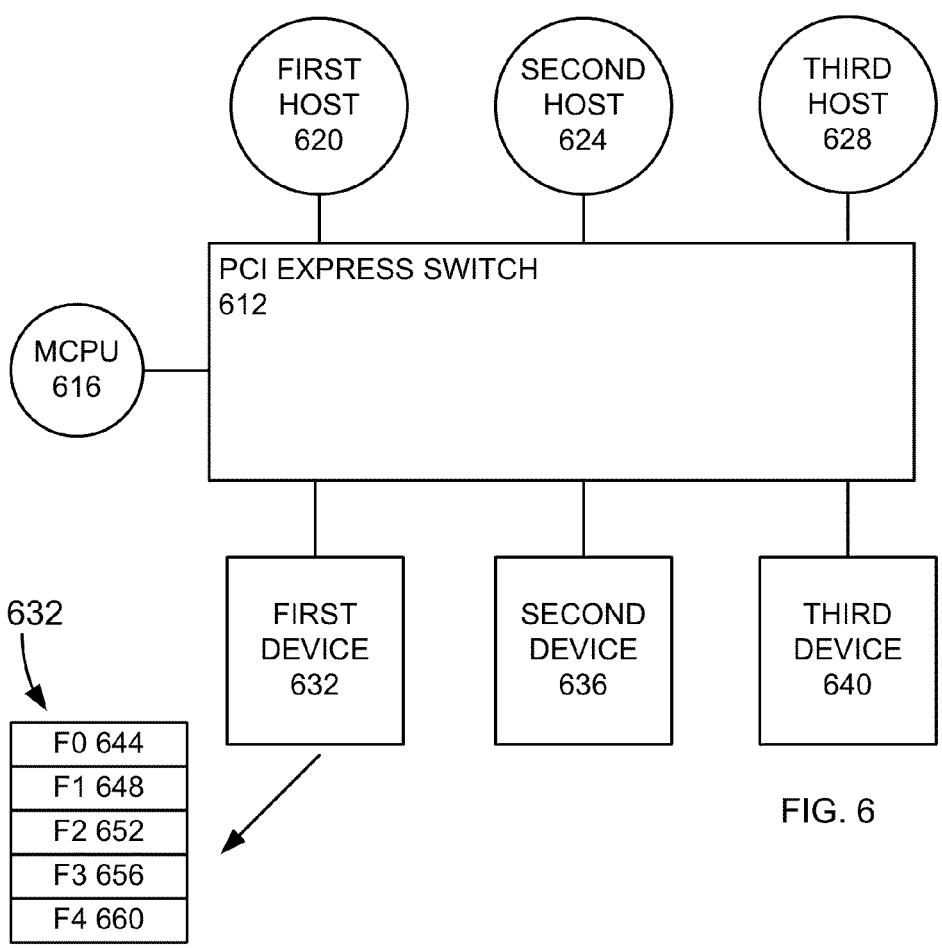
FIG. 6 is a more detailed schematic view of an embodiment of the invention.

FIG. 6 is a schematic view of an example of another implementation of an embodiment of the invention. In this example, a PCIe switch 612 is managed by an MCPU 616. A first host 620, second host 624, and third host 628 are connected to the PCIe switch 612. A first device 632, second device 636, and third device 640 are connected to the PCIe switch 612. A more detailed schematic of the first device 632 indicates that the first device has a first function F0 644, a second function F1 648, a third function F2 652, a fourth function F3 656, and a fifth function F4 660. In this example, a 64-bit OS, such as a distribution of Linux is used as an OS for the MCPU 616. The management system provides a single virtual PCI to PCI bridge under which a single non-volatile memory express (NVMe) synthetic endpoint is provided as function 0 where all other host endpoints are removed from the management software. The NVMe driver directly ties into the management side code, where either all the calls are through IOCTL or through a function pointer swapping using an initial input/output control (IOCTL) call.

In this example, the management software comprises a management and presentation component for management and presentation of synthetic NVMe devices to the connected hosts and managing the registers for those synthetic devices, an interfacing component for interfacing to the drivers of connected physical devices, such as NVMe drivers, a management interface component for management interface and associate logic to configure the sharing and consolidation of the device functions to a plurality of hosts, and a NVMe command processing logic component based on the industry standard NVMe specifications that maps host synthetic NVMe device requests to appropriate device commands, which also takes care of responses/command completions from device to the hosts and associated interrupts on those completion queues.

The management software sets up command and completion queues for each host's NVMe device based on the administrative command request from that host NVMe device. These queues are setup as shadow queues in management system memory. On the associated doorbell from the host NVMe device, management software gets the corresponding command queue entries from that host by setting up a direct memory access (DMA) operation. Once the command queue entries reach the management system memory, the management software processes this command, replacing any host system memory address with the corresponding prefixed address for that host, and then forwards the command to the associated device function through the device driver.

The PCIe switch is already configured by the management software to intercept and translate PCIe transactions from the device, using the prefixed address range to route to the associated host and also translate to the host address in flight. This enables the device to do I/O transactions with multiple hosts without worrying about memory address conflicts between the host address spaces.

On completion of a device command, device may be setup to write a completion entry to the completion queue in the management system or directly to the host if the completion queue is directly connected to a device on a one-to-one mapping of completion queues.

Interrupts on these completion queues can also be forwarded to the host through the management system or directly sent to the host depending on the mapping of that interrupt done by the management software.

Note that neither the device nor the host NVMe drivers are changed to make this sharing possible. As the devices are made by various, independent third party manufacturers and the NVMe driver is industry standard, operating system supplied driver, this current invention presents a solution that does not require changes to these while providing a new feature and benefit of sharing a non-sharable device with multiple hosts.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method of sharing of a function of a device with a plurality of hosts through a PCIe switch, the method comprising:

presenting a function on a device to a first host of a plurality of hosts and a second host of the plurality of hosts through the switch;

capturing read and write on the function's register set within the first host and within the second host, thereby enabling a management system of the switch to create a shadow copy of first host register sets and second host register sets;

enabling creation of sets of shadow queues on the management system, wherein a first set of shadow queues is a first set of registers for read and write operations between the function and the first host and wherein a second set of shadow queues is a second set of registers for read and write operations between the function and the second host, said sets of shadow queues reflecting command and response queues in the first and second hosts;

assigning, by the management system, for the function a first address for the first host and a second address for the second host, wherein the first address has a first prefix associated with the first host and the second address has a second prefix associated with the second host;

intercepting a PCIe transaction from the function of the device for one of the first and second hosts; and translating a prefixed address to route the PCIe transaction to the appropriate host and to use the first set of shadow queues of the first set of registers to direct read and write operations from the first host to the function and use the second set of shadow queues of the second set of registers to direct read and write operations from the second host to the function based on the PCIe transaction.

2. A method as recited in claim 1, wherein the device is an NVMe device.

3. The method, as recited in claim 1, wherein the enabling creation of sets of shadow queues on the management system comprises setting up a DMA operation.

4. The method, as recited in claim 3, wherein on completion of a device command the device writes a completion entry into a completion queue in the management system or directly to the first host or second host.

5. The method, as recited in claim 4, wherein interrupts on completion queues are forwarded to the first host or the second host through the management system or are directly sent to the first host or the second host.

6. The method, as recited in claim 1, further comprising assigning, by the management system, for the first function a first address for the first host and a second address for the second host.

7. The method, as recited in claim 6, wherein the first address is a host address with a first prefix and the second address is the host address with a second prefix different from the first prefix.

8. The method, as recited in claim 1, wherein the enabling creation of sets of shadow queues on the management system comprises setting up a DMA operation.

9. The method, as recited in claim 1, wherein on completion of a device command the device writes a completion entry into a completion queue in the management system or directly to the first host or second host.

10. The method, as recited in claim 1, wherein interrupts on completion queues are forwarded to the first host or the second host through the management system or are directly sent to the first host or the second host.

11. A Peripheral Component Interface Express (PCIe) switch interfacing between a plurality of hosts and a plurality of devices, the PCIe switch comprising:

a virtual function operable to interface with the devices through Single Root Input/Output Virtualization (SR-IOV); and a management system operable to detect addresses of registers of each of the hosts, to prefix those addresses, to establish shadow copies of registers of the hosts in the PCIe switch based on the prefixed addresses, to detect a command from a first of the devices for a first of the hosts via the virtual function in response to an Input/Output (I/O) request of the first host system, to retain packets associated with the command in the shadow copy of the first host register, to remove the prefixed address from the command, and to forward the packets to the first host without conflicting with addresses of the remaining hosts.

12. A method operable in a Peripheral Component Interface Express (PCIe) switch interfacing between a plurality of hosts and a plurality of devices, the method comprising:

interfacing a virtual function with the devices through Single Root Input/Output Virtualization (SR-IOV);

detecting addresses of registers of each of the hosts;

prefixing those addresses;

establishing shadow copies of registers of the hosts in the PCIe switch based on the prefixed addresses;

detecting a command from a first of the devices for a first of the hosts via the virtual function in response to an Input/Output (I/O) request of the first host system;

retaining packets associated with the command in the shadow copy of the first host register;

removing the prefixed address from the command; and forwarding the packets to the first host without conflicting with addresses of the remaining hosts.

* * * * *